(12) United States Patent
Lee

(10) Patent No.: US 12,298,658 B2
(45) Date of Patent: May 13, 2025

(54) APERTURE, CAMERA MODULE, AND ELECTRONIC DEVICE

(71) Applicant: HUAWEI TECHNOLOGIES CO., LTD., GuangDong (CN)

(72) Inventor: Kuni Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 17/884,967

(22) Filed: Aug. 10, 2022

(65) Prior Publication Data

US 2022/0382128 A1 Dec. 1, 2022

Related U.S. Application Data

(63) Continuation of application No. PCT/CN2021/074239, filed on Jan. 28, 2021.

(30) Foreign Application Priority Data

Feb. 11, 2020 (CN) .......................... 202010087176.0

(51) Int. Cl.
*G03B 9/06* (2021.01)

(52) U.S. Cl.
CPC ....................... *G03B 9/06* (2013.01)

(58) Field of Classification Search
CPC ............... G03B 9/02; G03B 9/06; G03B 9/24
See application file for complete search history.

(56) References Cited

U.S. PATENT DOCUMENTS

| 4,367,931 A | 1/1983 | Kawai et al. |
| 2009/0269048 A1* | 10/2009 | Suzuki ................ G03B 9/06 396/510 |
| 2020/0012170 A1* | 1/2020 | Hong ................ G02B 26/02 |

FOREIGN PATENT DOCUMENTS

| CN | 101907814 A | 12/2010 |
| CN | 102419504 A | 4/2012 |
| CN | 102466943 A | 5/2012 |
| CN | 102778802 A | 11/2012 |
| CN | 103809347 A | 5/2014 |
| CN | 105607385 A | 5/2016 |
| CN | 107407854 A | 11/2017 |
| CN | 108777760 A | 11/2018 |
| CN | 109387993 A | 2/2019 |
| CN | 110460764 A | 11/2019 |
| CN | 110554547 A | 12/2019 |
| CN | 110579925 A | 12/2019 |

(Continued)

*Primary Examiner* — Christopher E Mahoney
(74) *Attorney, Agent, or Firm* — Rimon PC

(57) ABSTRACT

This application provides for an aperture, a camera module, and an electronic device. The aperture includes a base, a carrier base, a driving part, a resilient sheet, and a plurality of blades. A first optical hole for light to pass through is formed on the base. Each blade is hingedly coupled to the base, and the plurality of blades are distributed annularly around the first optical hole. A light entry hole that is formed by the plurality of blades is coaxial with the first optical hole. The carrier base is connected to the base by using the resilient sheet, and the carrier base is configured to drive each blade to rotate relative to the base. This may result in a change in the size of the light entry hole. The driving part is configured to drive the carrier base to rotate by using an axis line of the first optical hole as a rotational axis.

11 Claims, 10 Drawing Sheets

(56) References Cited

FOREIGN PATENT DOCUMENTS

| | | | | |
|---|---|---|---|---|
| CN | 110602367 A | 12/2019 | | |
| CN | 110703534 A | 1/2020 | | |
| JP | 2010014814 A | 1/2010 | | |
| KR | 20060045207 A | * 5/2006 | ............... | G03B 9/02 |

* cited by examiner

APERTURE, CAMERA MODULE, AND ELECTRONIC DEVICE

CROSS-REFERENCE TO RELATED APPLICATIONS

This application is a continuation of International Application No. PCT/CN2021/074239, filed on Jan. 28, 2021, which claims priority to Chinese Patent Application No. 202010087176.0, filed on Feb. 11, 2020. The disclosures of the aforementioned applications are hereby incorporated by reference in their entireties.

TECHNICAL FIELD

This application relates to the field of terminal device technologies, and in particular, to an aperture, a camera module, and an electronic device.

BACKGROUND

An aperture is commonly used in a single-lens reflex camera to adjust a size of a hole for light to pass through. A shutter that cooperates with a camera module may determine an incident light amount. The incident light amount herein may affect a depth of field and imaging quality. Therefore, the aperture plays an important role in a photographing operation. Generally, an aperture that adjusts the incident light amount includes a plurality of blades, and the plurality of blades are distributed annularly to form a light entry hole for light to pass through. Driving the plurality of blades to move may adjust a size of the light entry hole, thereby changing the incident light amount. Currently, a blade of an aperture in a single-lens reflex camera may be driven by an ultrasonic motor or a stepping motor when driving a gear, or may be driven by a lever.

With developments in science and technology, electronic devices, such as a mobile phones or tablet computers, have an increasingly higher requirement in their photographing functions, so that it may achieve a photographing effect close to that of a single-lens reflex camera. However, an overall structure of an existing aperture that is applied to a single-lens reflex device may be too large to be applied to such an electronic device.

SUMMARY

This application provides an aperture, a camera module, and an electronic device, where the aperture is applied to a camera module of a miniature electronic device, to cooperate with a shutter, to adjust an amount of light entering a camera component, and thereby improve photographing quality.

According to a first aspect, this application discloses an aperture that can be applied to a camera module, where the aperture includes a base, a carrier base, a driving part, a resilient sheet, and a blade group. The base may be a supporting structure and may be configured to be installed on a camera component when in use. The base thereby acts as a supporting (e.g., structural) feature. A first optical hole is formed on the base to allow for light to pass through. When the aperture is installed on the camera component, an axis line of the first optical hole is collinear with an optical axis of the camera component. The blade group includes a plurality of blades that are distributed annularly around the first optical hole. The adjacent blades overlap with each other to form a light entry hole that is coaxial with the first optical hole among the plurality of blades. Each blade is hinged (e.g., hingedly coupled) to the base and may rotate around a hinge point relative to the base. When all the blades rotate according to a specified path, a size of the light entry hole can be adjusted, to achieve multi-gear adjustment of an incident light amount. Herein, a structure used to drive the plurality of blades to rotate is the carrier base, and the carrier base may be disposed between the base and the plurality of blades. The carrier base is connected to (e.g., coupled to) the base by using the resilient sheet. When the carrier base rotates relative to the base, the carrier base can drive all of the blades to move according to the specified path, so that each blade rotates around the hinge point relative to the base. This results in a change to the size of the light entry hole, so as to implement an adjustment of the aperture. A structure for driving the carrier base to rotate is the driving part. The driving part is disposed on the base and is configured to provide a forward torque that drives the carrier base to rotate, so that the carrier base can rotate around an axis line of a first optical axis. In addition, the resilient sheet may be elastically fixed with (e.g., coupled to) the carrier base to the base. When the carrier base rotates relative to the base, while being driven by the driving part, the driving part provides a forward torque to the carrier base. The resilient sheet may provide a reverse torque that is opposite in direction to the forward torque onto the carrier base. This configuration may limit a position of the carrier base relative to the base. When the forward torque stops, the resilient sheet returns to an initial state and may drive the carrier base to return to an initial state.

The aperture uses the driving part to drive the carrier base to rotate, and then drive the plurality of blades hinged to the base to change the size of the light entry hole in a linked manner. These components may then cooperate with the shutter of the camera module to adjust the incident light amount. In addition, the carrier base is elastically coupled to the base by using the resilient sheet. The resilient sheet can provide a reverse torque onto the carrier base when the driving part drives the carrier base to rotate relative to the base, and may further drive the carrier base to reset when the forward torque stops. The driving part in the aperture may be set as a miniature driver. A structure of the resilient sheet may also be relatively light and thin. The driving part, cooperating with the resilient sheet, may provide a driving force for a driving size adjustment of the aperture. This is beneficial for realizing a small size structure of the aperture. Therefore, the aperture may be applied to a camera module of a miniature electronic device, to meet photographing requirements with the miniature electronic device.

In the aperture, the driving part is configured to drive the carrier base to rotate relative to the base around the axis line of the first optical hole. A moving path of any point on the carrier base may form an arc line with the axis line of the first optical hole as a circle center. The driving part may act on any point of the carrier base, and exert a force on the carrier base along a tangential direction of the point, to drive the carrier base to rotate. In addition, to stabilize the driving force on the carrier base, two driving parts may be utilized. The two driving parts may be symmetrical about the axis line of the first optical hole. The carrier base herein may then define an annular shape.

When the driving part of the aperture uses a miniature driver, the driving part may be implemented in a plurality of manners according to various embodiments.

In some embodiments, the driving part includes a driving coil and a driving magnet. The driving coil is coupled to a side of the base facing the carrier base. The driving magnet may be coupled to a side of the carrier base facing the base. When the driving coil is energized, a magnetic field is formed, and the driving magnet may be driven when it is within the magnetic field. By adjusting a current direction and a current magnitude in the driving coil, the driving magnet can be controlled to move according to a specified path, and the carrier base is driven to rotate relative to the base.

In some embodiments, the driving part may be a piezoelectric driver, a fixed end of the piezoelectric driver is fixed on the base, and a power output end of the piezoelectric driver is connected to the carrier base. The piezoelectric driver may be a piezoelectric motor, a piezoelectric cantilever driver, or the like.

In some embodiments, the driving part may include a fixed block and a connecting member made of a shape memory alloy. The fixed block is configured to be coupled to the base, and the connecting member may be connected between the fixed block and the carrier base. The shape memory alloy herein can remember a shape, and can be elongated or shortened under an impact of external environment. When heated, the shape memory alloy can be restored to an original shape. Controlling the elongation and shortening of the shape memory alloy can achieve an effect of driving the carrier base to rotate.

To more accurately control an action of the carrier base, an induced magnet may be further disposed on the carrier base. A position detection module, that is configured to cooperate with the induced magnet, may be disposed on the base. When the carrier base rotates, the position detection module may sense the position of the induced magnet to obtain positional information of the carrier base. In operation, the position detection module may be further connected to a master controller of the entire camera module, or may be connected to a main board of an electronic device (for example, a mobile phone), to provide feedback of the positional information of the carrier base to the master controller of the camera module or the main board of the electronic device. In this way, the master controller or the main board can conveniently control the driving part.

A quantity of the blades is not limited, and may be adjusted according to a photographing requirement. For example, there may be six blades. A shaft hole may be formed on each blade, and a hinged shaft that is configured to cooperate with the shaft hole is correspondingly formed on the base. The blade is hingedly coupled to the base by using the hinged shaft. A sliding slot may further be formed on each blade, and a sliding shaft that is configured to cooperate with the sliding slot is correspondingly formed on the carrier base. Movement of the sliding shaft along the sliding slot defines a path of rotation of the blade relative to the base. When the aperture is adjusted, the carrier base rotates, and the sliding shaft moves along the sliding slot on the blade, so that the blade can be driven to rotate relative to the base around the hinged shaft. It should be noted that, to reduce a height of an entire structure, a rotation hole and a sliding slot on the blade may define a structure similar to a counterbore.

In addition, a partition plate may be included and disposed on any side of the blade group along a direction of the optical axis. A second optical hole can be used for light to pass through is then formed on the partition plate. The second optical hole is coaxial with the light entry hole formed by the plurality of blades, to facilitate light to pass through. It can be learned from the foregoing that the size of the light entry hole formed by the plurality of blades can be adjusted. Herein, a diameter of the second optical hole is less than a maximum value of the light entry hole, which is equivalent to that a maximum incident light amount of the aperture is limited by the second optical hole on the partition plate.

According to a second aspect, this application further discloses a camera module. The camera module may be applied to a miniature electronic device such as a mobile phone or a tablet computer, and may include a camera component and any one of the foregoing apertures. The aperture may be disposed on a light entry side of the camera component, to perform multi-gear adjustment on light entering the camera component.

According to a third aspect, this application further discloses an electronic device. The electronic device may be a mobile phone or a tablet computer. A camera module is installed on a device body to implement a photographing function. The camera module has an aperture that can be adjusted among a plurality of gears, and can meet a higher photographing requirement.

Figure 1:
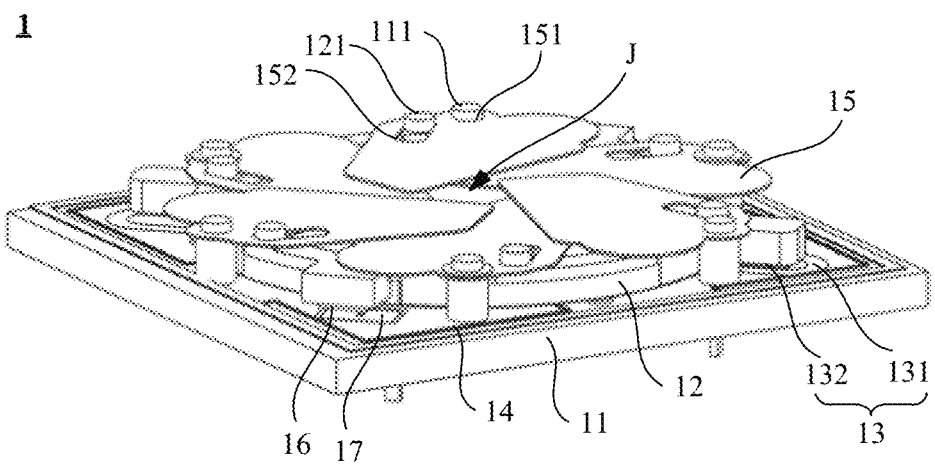
FIG. 1 is a schematic diagram of a structure of an aperture according to embodiments of this application.

Reference numerals: 1—aperture: 11—base: 111—hinged shaft: 112—first optical hole: 113—installation position: 114—installation groove: 12—carrier base: 121—sliding shaft: 13—driving part: 131—driving coil: 132—driving magnet: 133—piezoelectric driver; 134—fixed block: 135—connecting member: 14—resilient sheet: 141—inner frame: 142—outer frame: 143—connecting strip: 15—blade: 151—rotation hole: 152—sliding slot: 16—induced magnet: 17—position detection module: 18—partition plate: 181—second optical hole: 19—top cover: 191—third optical hole: 2—camera component: 21—lens: 22—camera motor: 23—image sensor: 10—camera module: 20: mobile phone body: 100—mobile phone.

DESCRIPTION OF EMBODIMENTS

In a single-lens reflex camera, an aperture is a structure that can cooperate with a shutter to adjust an incident light amount. Conventionally, however, a driving structure applied to a single-lens reflex camera for aperture adjustment occupies a relatively large space. The size of the driving structure may not be directly used for a miniature electronic device. Especially as miniature electronic devices have an increasingly higher requirement for a photographing function. Therefore, with reference to an application scenario of a camera module of an electronic device, this application provides an aperture, configured to cooperate with a shutter to adjust an amount of light entering a camera module of a miniature electronic device. It may be understood that the miniature electronic device herein may include a product such as a mobile phone, a tablet computer, or a vehicle-installed monitoring device.

To describe the technical solutions in embodiments of this application more clearly, the following further describes in detail the aperture provided in this application with reference to the accompanying drawings. It should be understood that words "first", "second", and the like below are only used for distinguished description, and shall not be understood as an indication or implication of relative importance or indication or implication of an order.

Referring to FIG. 1, an aperture 1 in embodiments of this application may include a base 11, a carrier base 12, a driving part 13, a resilient sheet 14, and a blade group including a plurality of blades 15. The base 11 is equivalent to a supporting feature, and is configured to be installed on another structure of a camera module during operation, to bear and support a structure of the entire aperture 1. A material of the base 11 may be plastic, or any other suitable material. This is not limited in this application. The carrier base 12 is elastically fixed on (e.g., coupled to) the base 11 by using the resilient sheet 14, and the carrier base 12 may be driven by using the driving part 13 disposed on a peripheral side of the carrier base 12. This allows the carrier base 12 to rotate relative to the base 11. When the carrier base 12 rotates relative to the base 11, while being operatively driven by the driving part 13, the driving part 13 provides a forward torque for the carrier base 12. A part of the resilient sheet 14 that is connected to the base 11 is fixed, and a part of the resilient sheet 14 that is connected to the carrier base 12 rotates with the carrier base 12. The resilient sheet 14 provides a reverse torque in an opposite direction of the forward torque onto the carrier base 12. When the driving part 13 stops driving or disengages the carrier base 12, recovery of the resilient sheet 14 may drive the carrier base 12 back to an original position. In embodiments, due to the carrier base 12 rotating relative to the base 11, there may be two driving parts 13 that are symmetrically disposed to balance the rotational force. Herein, the driving part 13 may include a driving coil 131 and a driving magnet 132, where the driving coil 131 is installed on a side of the base 11 facing the carrier base 12. Accordingly, the driving magnet 132 may be installed on a side of the carrier base 12 facing the base 11. When the driving coil 131 is energized (e.g., provided power), a magnetic field is formed, and the driving magnet 132 may be driven when it is within the magnetic field. By adjusting a current direction and a current magnitude in the driving coil 131, the driving magnet 132 can be controlled to move according to a specified path, and the carrier base 12 is driven to rotate relative to the base 11.

Still referring to FIG. 1, during operation, the driving part 13 may be controlled by a master controller of the camera module or a main board of an electronic device. To more accurately control an action of the carrier base 12, an induced magnet 16 may further be disposed on the carrier base 12. Correspondingly, a position detection module 17, that is configured to cooperate with the induced magnet 16, may be disposed on the base 11. When the carrier base 12 rotates relative to the base 11, the position detection module 17 may sense a position of the induced magnet 16 to obtain positional information of the carrier base 12. It may be assumed that the aperture 1 is applied to a camera module of a mobile phone, and the position detection module 17 may be communicatively coupled to a main board of the mobile phone, or may be communicatively coupled to a master controller of the camera module. The camera module of the mobile phone and the position detection module 17 may then provide a signal to provide feedback of the positional information of the carrier base 12 to the main board of the mobile phone or the master controller of the camera module, so that the main board or the master controller can conveniently control the driving part 13. In FIG. 1, the driving part 13 is formed cooperatively by the driving coil 131 and the driving magnet 132. Accordingly, control over the driving part 13 by the main board or the master controller is realized by controlling connection/disconnection of a current, a current direction, and/or a current magnitude in the driving coil 131. In addition, to facilitate the position detection module 17 to feedback the positional information, a circuit for conducting an electrical signal may be formed on the base 11 in an in-mold metal injection manner, or a flexible circuit board that may be attached.

FIG. 1 shows that a blade group which includes six blades 15 distributed annularly, and where adjacent blades 15 overlap with each other, so that a closed loop is formed among a plurality of blades 15. This configuration then forms a light entry hole J for light to pass through. Each blade 15 is hinged (e.g., hingedly coupled) to a hinged shaft 111 on the base 11 by using a rotation hole 151. Each blade 15 slidably cooperates with a sliding shaft 121 disposed on the carrier base 12 by using a sliding slot 152 disposed on the blade 15. When the driving part 13 drives the carrier base 12 to rotate, the carrier base 12 may drive the blade 15 to rotate relative to the base 11 and around the corresponding hinged shaft 111, thereby adjusting a size of the light entry hole J. This configuration obtains an effect of adjusting an incident light amount. FIG. 1 shows a structural form in which the carrier base 12 is disposed between the base 11 and the blade 15. A specific structure among the carrier base 12, the base 11, and the blade 15 is not limited thereto, and may be implemented in another form in which the carrier base 12 drives the blade 15 to rotate relative to the base 11. This is not limited to the embodiments in this application.

Figure 2:
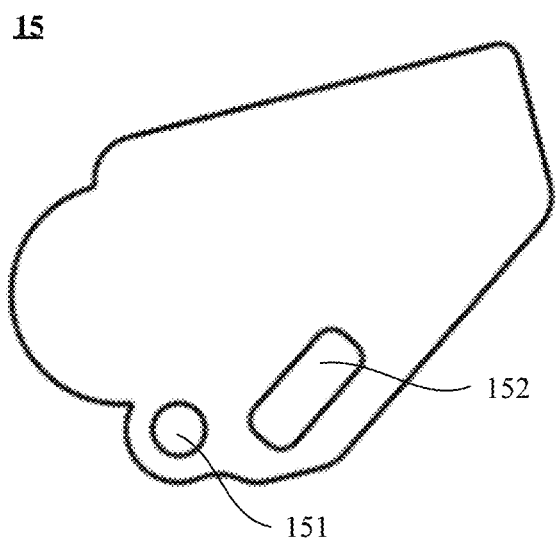
FIG. 2 is a schematic diagram of a structure of a blade in an aperture according to embodiments of this application.

For a structure of a single blade 15, as shown in FIG. 2, a rotation hole 151 and a sliding slot 152 are formed on the blade 15. The rotation hole 151 is configured to cooperate with the hinged shaft 111 on the base 11, and the sliding slot 152 is configured to cooperate with the sliding shaft 121 on the carrier base 12. It should be noted that, the rotation hole 151 and the sliding slot 152 on the blade 15 may be implemented in a structure similar to a counterbore, so that when the rotation hole 151 is hingedly coupled to the hinged shaft 111 and the sliding slot 152 cooperates with the sliding shaft 121, a height (e.g., of the aperture 1, the rotation hole 151, the carrier base 12, the base 11) is reduced, to reduce a height of an entire structure, thereby facilitating miniaturization of the aperture 1.

Figure 3:
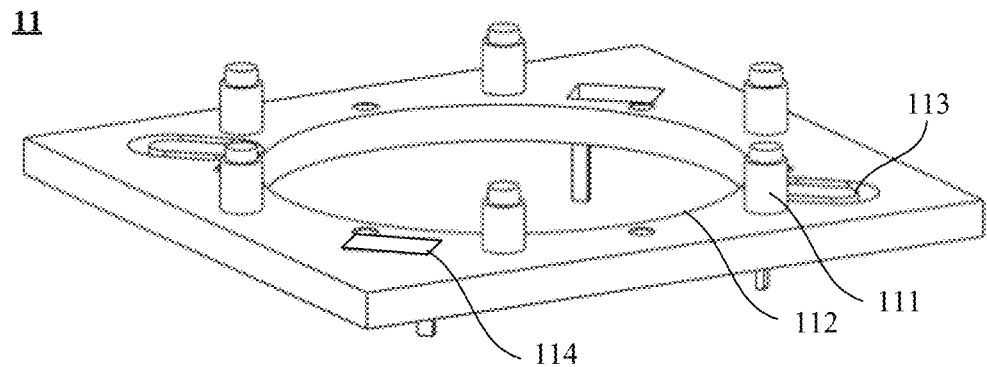
FIG. 3 is a schematic diagram of a structure of a base in an aperture according to embodiments of this application.
Figure 4:
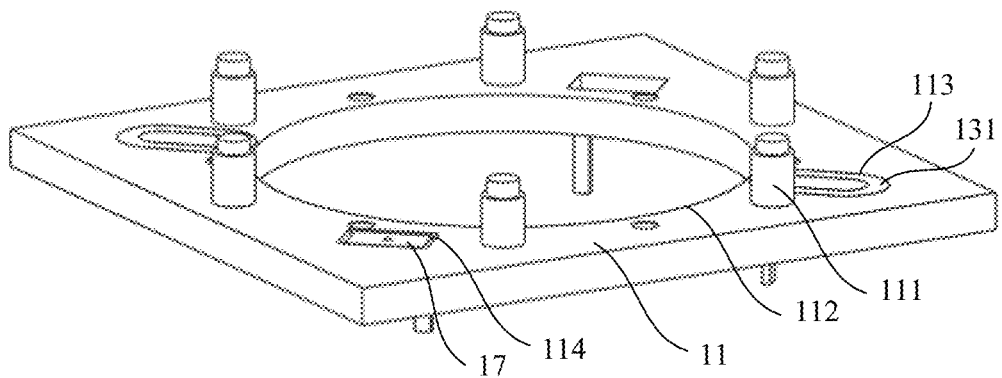
FIG. 4 is a schematic diagram of a structure of an aperture in which a position detection module and a driving coil are installed on a base according to embodiments of this application.

For a structure of the base 11, refer to FIG. 3. As depicted, the base 11 has a rectangular structure. The base 11 may have another shape, such as a hexagon or a circle. A first optical hole 112 for light to pass through is drilled in a center of the base 11. It may be understood that, in embodiments, when the aperture 1 is applied to a camera module of the electronic device, light passes through the aperture 1 to enter a camera component of the camera module. An axis line of the first optical hole 112 herein should be coaxial with an optical axis of the camera component, and a rotational axis used when the carrier base 12 rotates relative to the base 11 is the axis line of the first optical hole 112. Still referring to FIG. 3, the driving coil 131 of the driving part 13 may be installed on the base 11. Therefore, an installation position 113 for installing the driving coil 131 is disposed on the base 11. The position detection module 17 is installed on the base 11. Therefore, an installation groove 114 for installing the position detection module 17 is further disposed on the base 11. The driving coil 131 is installed at the installation position 113, and the position detection module 17 is installed in the installation groove 114, so that a structure shown in FIG. 4 can be obtained. Two installation grooves 114 that are symmetrical about a center of the first optical hole 112 are disposed on the base 11 in FIG. 3. The two installation grooves 114 and two installation positions 113 are respectively located at four corners of the base 11. The two installation grooves 114 correspond to a group of opposite angles, and the two installation positions 113 correspond to the other group of opposite angles. It may be understood that the position of the carrier base 12 can be detected by a pair of position detection modules 17 and the induced magnets 16.

Figure 5A:
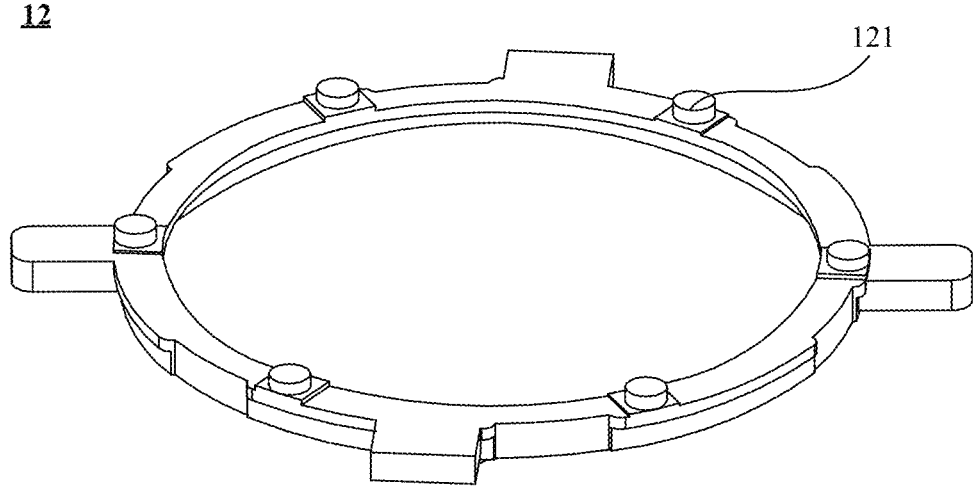
FIG. 5a is a schematic diagram of a structure of a carrier base in an aperture according to embodiments of this application.

Referring to a structure of the carrier base 12 shown in FIG. 5a, the carrier base 12 is generally circular. During cooperation and installation, the axis line of the carrier base 12 is coaxially assembled with the axis line of the first optical hole 112 of the base 11, so that when the aperture 1 is applied to the camera module, the carrier base 12 rotates relative to the base 11 by using an optical axis as a rotation center. It is foreseeable that when the driving part 13 drives the carrier base 12 to rotate relative to the base 11, a moving path of any point on the carrier base 12 may form an arc line with the axis line of the first optical hole 112 as a center of the circle. The driving part 13 may act on any point of the carrier base 12, and acting force is applied to the carrier base 12 along a tangent direction of the point, to drive the carrier base 12 to rotate. Therefore, the driving part 13 may be disposed on a peripheral side of the carrier base 12 to apply a forward torque to a side of the carrier base 12.

Figure 5B:
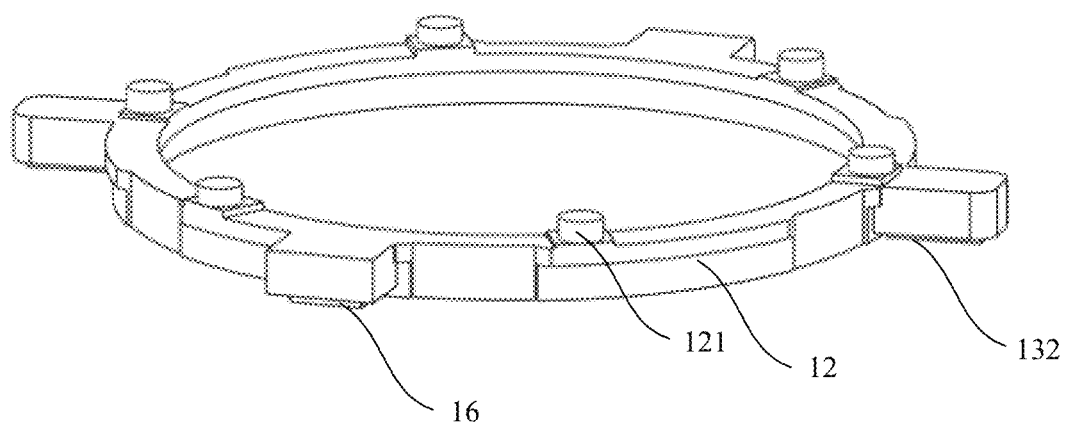
FIG. 5b is a schematic diagram of a structure of an aperture in which an induced magnet and a driving magnet are installed on a carrier base according to embodiments of this application.

Still referring to FIG. 5a, a plurality of sliding shafts 121 that are configured to cooperate with the sliding slots 152 on the blades 15 are disposed on the carrier base 12. A quantity of the sliding shafts 121 may be the same as a quantity of the blades 15, and one sliding shaft 121 may correspond to the sliding slot 152 on one blade 15. The induced magnet 16 is configured to cooperate with the position detection module 17 and is correspondingly disposed on a side of the carrier base 12 facing the base 11. The driving magnet 132 of the driving part 13 may also be disposed on a side of the carrier base 12 facing the base 11. The induced magnet 16 and the driving magnet 132 may be disposed on the carrier base 12 with reference to the structure shown in FIG. 5b.

Figure 6A:
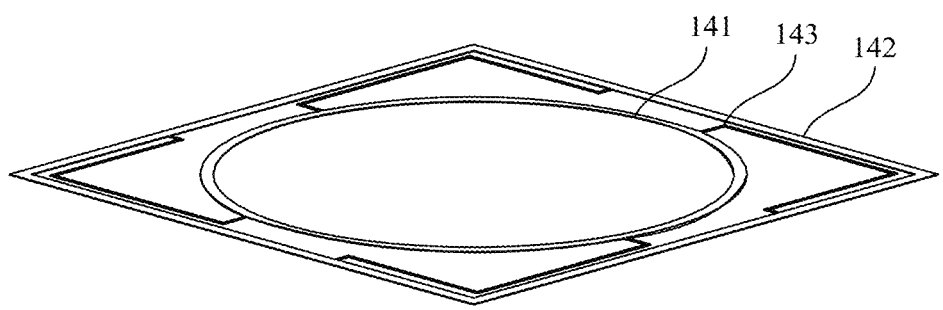
FIG. 6a is a schematic diagram of a structure of a resilient sheet in an aperture according to embodiments of this application.
Figure 6B:
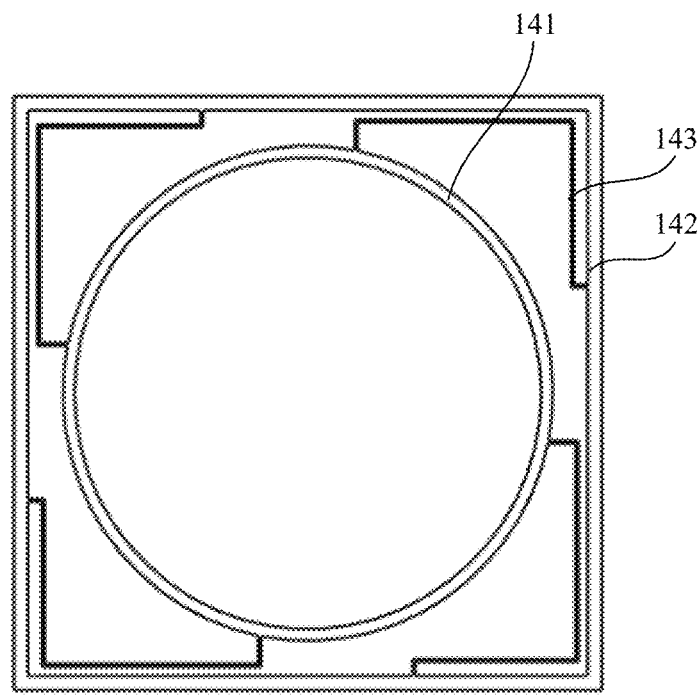
FIG. 6b is a top view of a resilient sheet in an aperture according to embodiments of this application.

The structures of the base 11 and the carrier base 12, for the resilient sheet 14 are connected between the base 11 and the carrier base 12. Refer to FIG. 6a and FIG. 6b. FIG. 6a shows a three-dimensional structure of the resilient sheet 14. The resilient sheet 14 may include an inner frame 141, an outer frame 142, and at least one connecting strip 143 connected between the inner frame 141 and the outer frame 142. FIG. 6b is a top view of the resilient sheet 14, where the inner frame 141 is annular, and is configured to connect to the annular carrier base 12. The outer frame 142 is rectangular, and may be configured to connect to the rectangular base 11. FIG. 6b shows four right-angle connecting strips 143, which respectively correspond with the four corners of the outer frame 142. One end of each connecting strip 143 is connected to the inner frame 141, and the other end is connected to the outer frame 142. FIG. 6a and FIG. 6b are merely examples for description. The structure of the resilient sheet 14 may be another shape (e.g., the resilient sheet 14 is connected between the base 11 and the carrier base 12, and therefore, the shape of the resilient sheet 14 may be adaptively adjusted according to the shapes of the base 11 and the carrier base 12). A quantity of the connecting strips 143 is not limited to four (4) as shown in the figure, and may instead be 2, 6, 7, etc.

Figure 7:
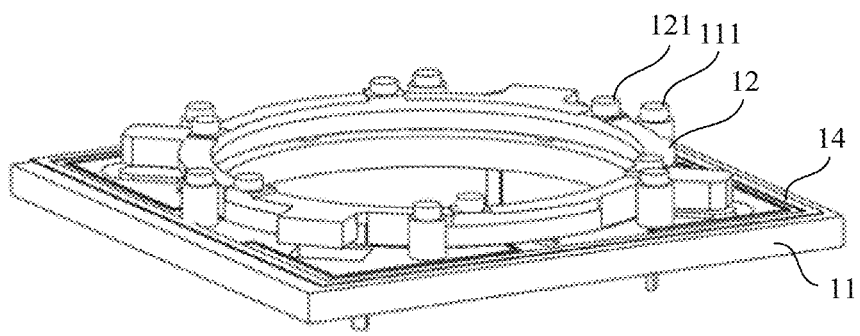
FIG. 7 is a schematic diagram of a structure of an aperture in which a carrier base is installed on a base by using a resilient sheet according to embodiments of this application.
Figure 8:
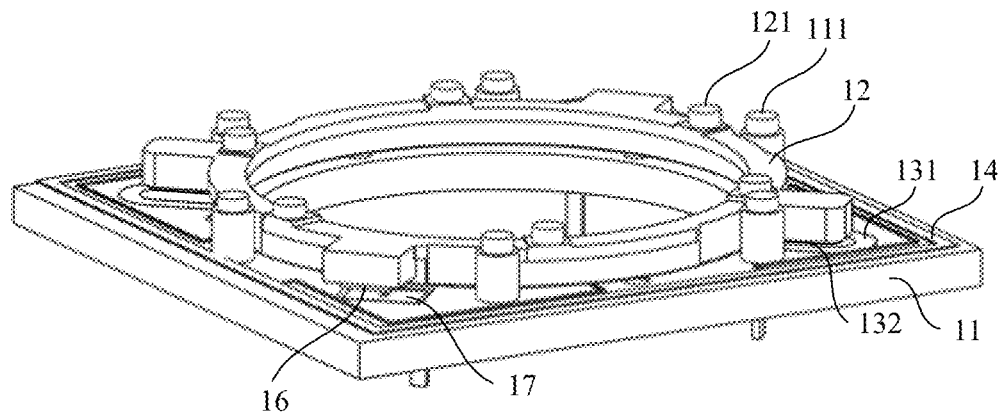
FIG. 8 is a schematic diagram of a structure of installing an induced magnet, a position detection module, a driving coil, and a driving magnet in the structure shown in FIG. 7.

The carrier base 12 shown in FIG. 5a may be installed on the base 11 as shown in FIG. 3, and the carrier base 12 may be connected to the base 11 by using the resilient sheet 14 as shown in FIG. 6a to obtain the structure shown in FIG. 7. The carrier base 12 may be connected to the inner frame 141 of the resilient sheet 14, the base 11 may be connected to the outer frame 142 of the resilient sheet 14, and the resilient sheet 14 may elastically fix (e.g., couple) the carrier base 12 to the base 11. Further, the driving coil 131 of the driving part 13 may be installed at the installation position 113 of the base 11, the position detection module 17 may be installed in the installation groove 114 of the base 11, the driving magnet 132 may be installed on the carrier base 12, and the induced magnet 16 may be installed on the carrier base 12. This configuration may then obtain a structure shown in FIG. 8. When the driving part 13 drives the carrier base 12 to rotate relative to the base 11 around the axis line of the first optical hole 112, the driving part 13 applies a forward torque onto the carrier base 12. The inner frame 141 of the resilient sheet 14 rotates with the carrier base 12, and the outer frame 142 is relatively fixed to the base 11. The inner frame 141 may then rotate relative to the outer frame 142. The connecting strip 143 that is connected between the inner frame 141 and the outer frame 142 is stretched and twisted, to apply a reverse torque onto the carrier base 12, thereby maintaining a connection structure of the carrier base 12 relative to the base 11. When the forward torque applied by the driving part 13 to the carrier base 12 stops (e.g., is no longer applied), the connecting strip 143 is reset, and may drive the carrier base 12 to an original position.

The aperture 1, by using the driving part 13 in cooperation with the resilient sheet 14, drives the blade 5 to then change the size of the light entry hole J (e.g., the driving part 13 and the resilient sheet 14 herein are directly acted on the carrier base 12, and then the carrier base 12 drives the blade 5 to move). Based on the foregoing structure, the driving part 13 may use a miniature driver. When the driving part 13 is set as a miniature driver, a lighter and thinner structure of the aperture 1 is facilitated in combination with a lighter and thinner structure of the resilient sheet 14. Further, the aperture 1 may be applied to a camera module of a miniature electronic device (for example, a mobile phone), to meet increasingly higher quality photographing requirements of such an electronic device.

Figure 9:
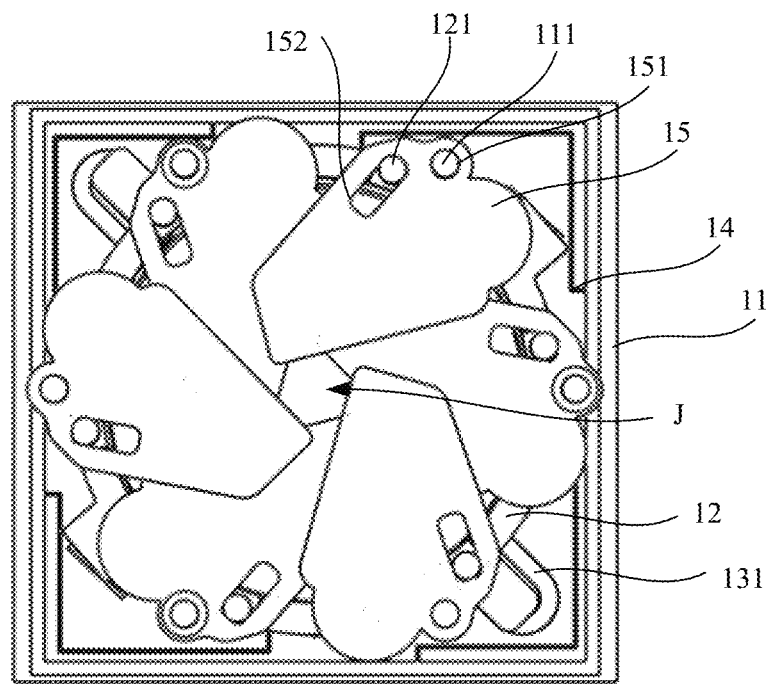
FIG. 9 is a top view of an aperture according to embodiments of this application.

A three-dimensional structure of the aperture 1 is shown in FIG. 1 and FIG. 9 with a top view of the aperture 1 in FIG. 1. Six blades 15 are distributed annularly with the axial line of the first optical hole 112 of the base 11 disposed at a circle center. When the aperture 1 is applied to the camera module of the electronic device, the axis line of the light entry hole J formed by the six blades 15, the axis line of the carrier base 12, and the axis line of the first optical hole 112 of the base 11 are collinear, and the axis line is collinear with an optical axis of the camera module. The carrier base 12 rotates relative to the base 11 by using the optical axis as a rotational axis.

Figure 10:
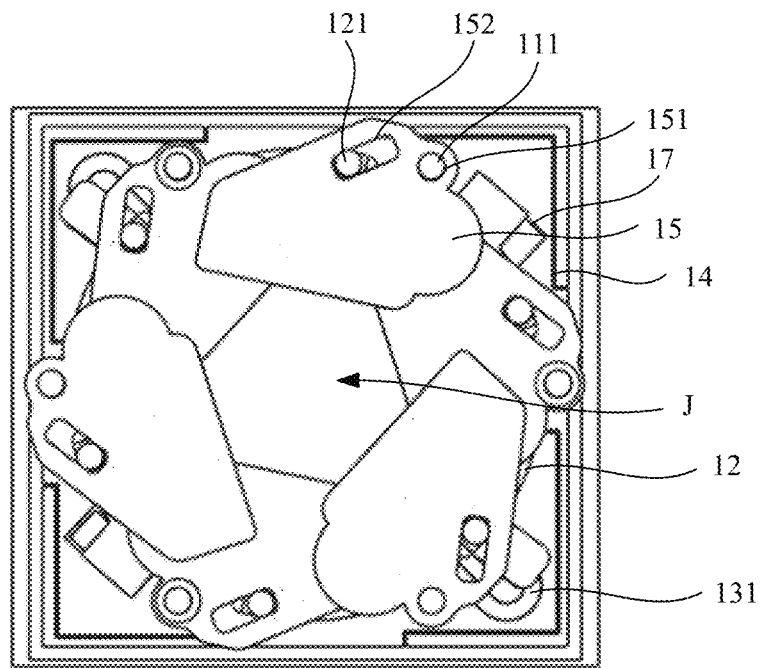
FIG. 10 is a top view of an adjusted larger light entry hole of an aperture according to embodiments of this application.

A position of the blade 15 in the initial aperture 1 is set as shown in FIG. 9, and the sliding shaft 121 is located at one end of the sliding slot 152. The driving part 13 drives the carrier base 12 to rotate counterclockwise relative to the base 11, the sliding shaft 121 on the carrier base 12 moves toward the other end of the sliding slot 152 along the sliding slot 152 on the corresponding blade 15, and the blade 15 rotates clockwise relative to the base 11 around the hinged shaft 111. Each blade 15 rotates in a direction away from the light entry hole J, thereby causing the light entry hole J to continuously increase in size. FIG. 7 shows a state in which the sliding shaft 121 moves to the other end of the sliding slot 152. A process of changing the structure shown in FIG. 9 to the structure shown in FIG. 10 is a process of gradually increasing the light entry hole J. On the contrary, a process of changing the structure shown in FIG. 10 to the structure shown in FIG. 9 is a process of gradually decreasing the light entry hole J. Details are not described herein again. In operation, the driving force of the driving part 13 onto the carrier base 12 can be controlled to realize multi-size adjustment of the light entry hole J, that is, to cause multi-gear adjustment of the aperture 1.

Figure 11:
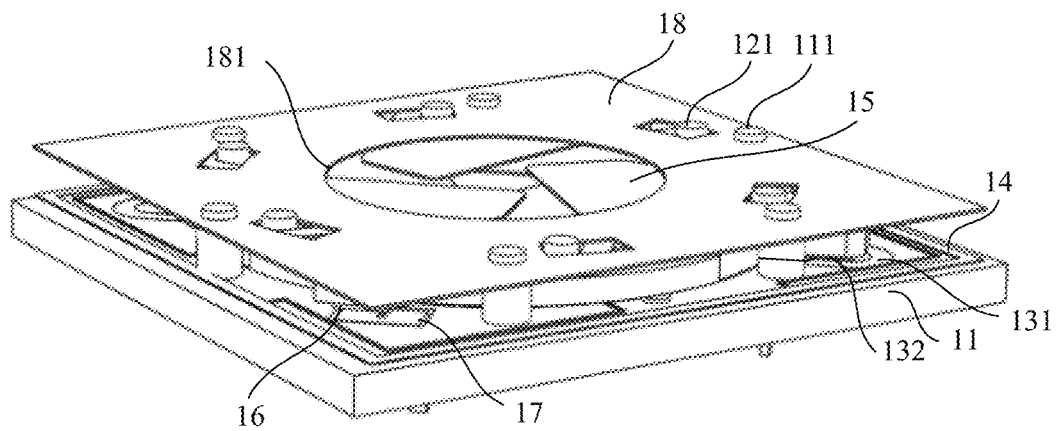
FIG. 11 is a schematic diagram of a structure of an aperture with a partition plate according to embodiments of this application.

In some embodiments, based on the structure of the aperture 1 shown in FIG. 1, a partition plate 18 may be disposed on any side of the blade group along the direction of the optical axis. Referring to an example structure shown in FIG. 11 in which a partition plate 18 is disposed on a side that is of the plurality of blades 15 of the blade group and that faces away from the base 11, a second optical hole 181 is formed on the partition plate 18, so that light can pass through the second optical hole 181 to reach the light entry hole J formed by the plurality of blades 15. A diameter of the second optical hole 181 on the partition plate 18 herein is smaller than a maximum diameter of the light entry hole J formed by the plurality of blades 15, which may be equivalent to that of a maximum value of an incident light amount of the aperture 1. In other words, an upper limit of the incident light amount. In addition, the partition plate 18 may be disposed between the blade 15 and the carrier base 12, and the upper limit of the incident light amount may still be limited.

Figure 12:
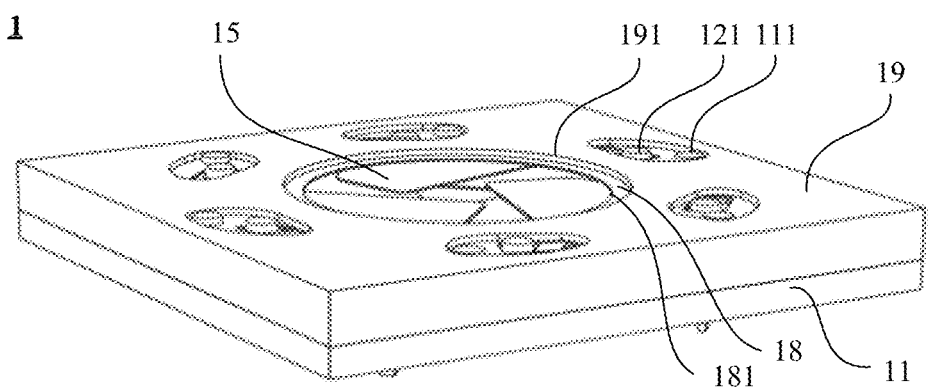
FIG. 12 is a schematic diagram of a structure of an aperture with a top cover partition plate according to embodiments of this application.
Figure 13:
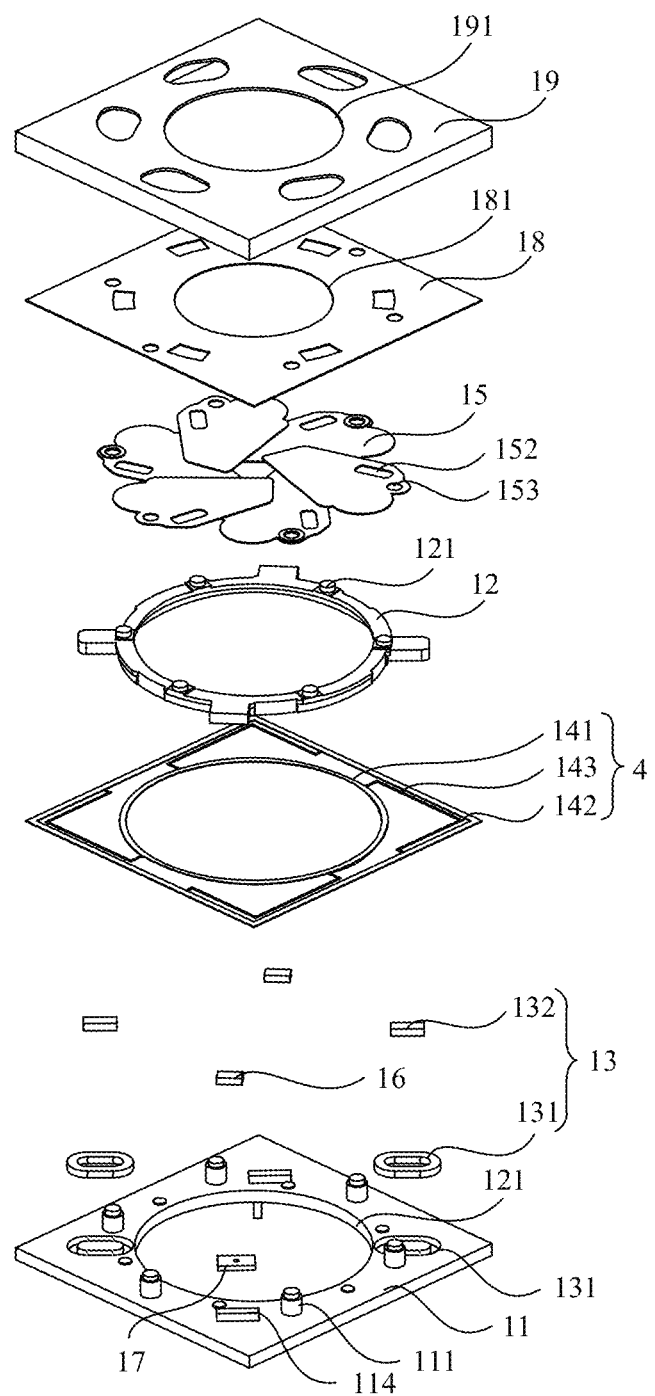
FIG. 13 is an exploded view of the aperture shown in FIG. 11.

To ensure structural integrity, a top cover 19 is further disposed in the aperture 1 in this application. As shown in FIG. 12, the base 11 and the top cover 19 cooperate upwards and downwards to form an accommodation space between the base 11 and the top cover 19. The carrier base 12, the driving part 13, the resilient sheet 14, and the plurality of blades 15 are disposed in the accommodation space, and a third optical hole 191 for light to pass through is formed on the top cover 19. Herein, a diameter of the third optical hole 191 on the top cover 19 is greater than the maximum diameter of the light entry hole J formed by the plurality of blades 15. This may prevent a light shielding problem from occurring. Taking a manner of disposing the partition plate 18 shown in FIG. 11 as an example, the partition plate 18 is equivalent to being located between the top cover 19 and the plurality of blades 15. Therefore, a top of the aperture 1 in FIG. 12 may expose the internal blade 15, the partition plate 18, and the second optical hole 181 on the partition plate 18. For a better understanding of the structure of the aperture 1 shown in FIG. 8, refer to an exploded view shown in FIG. 13.

In addition, referring to the aperture 1 shown in FIG. 1, both the hinged shaft 111 and the sliding shaft 121 protrude from a surface of the blade 15. In order not to prevent the driving part 13 from driving the carrier base 12 and the carrier base 12 from driving the blade 15 to rotate, in the structures of the aperture 1 shown in FIG. 11 and FIG. 12, a through hole for protruding the hinged shaft 111 and the sliding shaft 121 is further separately disposed on the top cover 19 and the partition plate 18.

The driving part 13 in the foregoing embodiments may be implemented in a form in which the driving coil 131 cooperates with the driving magnet 132, and the driving part 13 may be implemented in other driving manners.

Figure 14:
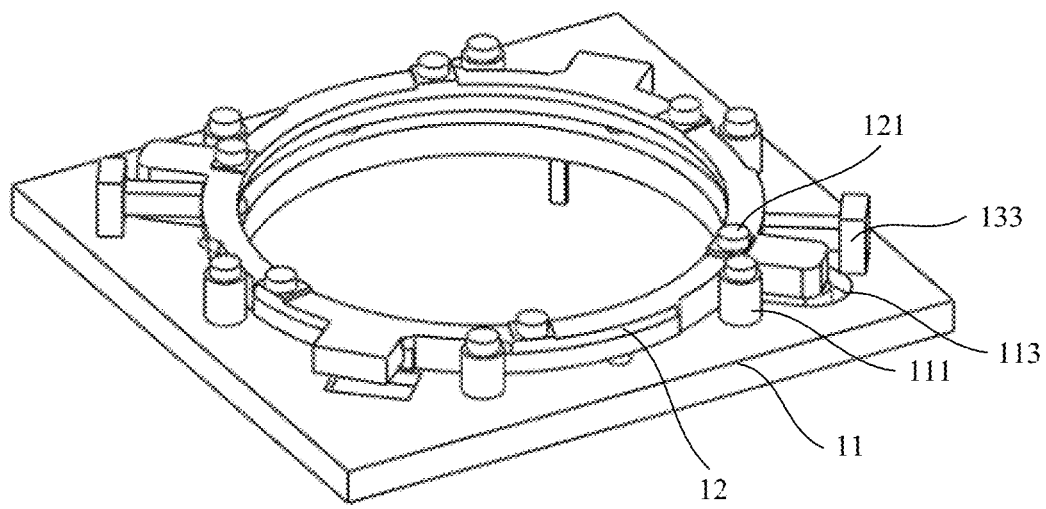
FIG. 14 is a schematic diagram of a structure of a base, a driving part, and a carrier base in another aperture according to embodiments of this application.

In embodiments in which a piezoelectric driving manner is used, as shown in FIG. 14, the driving part 13 is a piezoelectric driver 133, a fixed end of the piezoelectric driver 133 is fixed to the base 11, and a power output end thereof is connected to the carrier base 12. It should be noted that FIG. 14 only illustrates structures of the base 11, the carrier base 12, and the piezoelectric driver 133. The installation position 113 on the base 11 that is used to install the driving coil 131 may be retained (as shown in FIG. 14), or may be removed. The piezoelectric driver 133 may be a piezoelectric motor, a piezoelectric cantilever driver, or another suitable driver.

Figure 15:
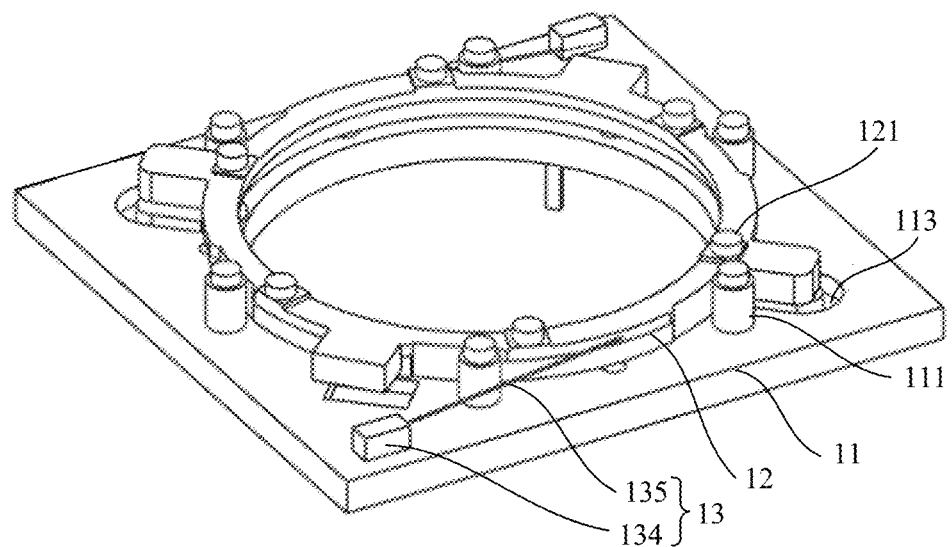
FIG. 15 is a schematic diagram of a structure of a base, a driving part, and a carrier base in another aperture according to embodiments of this application.

In embodiments in which a memory alloy driving manner is used, as shown in FIG. 15, the driving part 13 may include a fixed block 134 and a connecting member 135 made of a shape memory alloy: where the fixed block 134 is fixed to the base 11, where one end of the connecting member 135 is fixed to the fixed block 134, and the other end thereof is connected to the carrier base 12. Similar to FIG. 14. FIG. 15 shows only the base 11, the carrier base 12, the fixed block 134, and the connecting member 135. The installation position 113 on the base 1 used to install the driving coil 131 may be retained (as shown in FIG. 15), or may be removed. FIG. 15 shows two fixed blocks 134 that are symmetrical about the axis line of the first optical hole 112 of the base 11 and two connecting members 135 that are symmetrical about the axis line of the first optical hole 112 of the base 11.

Figure 16:
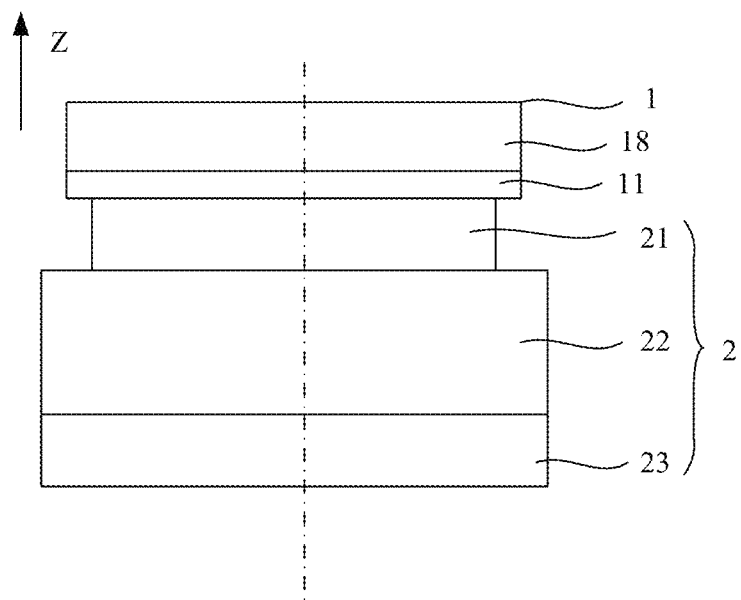
FIG. 16 is a schematic diagram of a structure of a camera module according to embodiments of this application.

Based on a same disclosure, this application further provides a camera module 10 that can be applied to an electronic device. As shown in FIG. 16, the camera module 10 may include a camera component 2 and any aperture 1 provided in the foregoing embodiment. The aperture 10 is disposed on a light entry side of the camera component 2 to adjust light entering the camera component 2, to meet a photographing requirement of the camera component 2. Still referring to FIG. 16, the camera component 2 may include a lens 21, a camera motor 22, and an image sensor 23. The lens 21 is installed at a free end of the camera motor 22, the image sensor 23 is disposed at a fixed end of the camera motor 22, and the camera motor 22 is configured to drive the lens 21 to reciprocate along a Z-axis direction to implement zooming. The aperture 1 may be disposed at an end of the lens 21 away from the camera motor 22. The end of the lens 21 away from the camera motor 22 is a light entry side of the lens 21. The axis line of the base 11 in the aperture 1, the axis line of the carrier base 12, and the axis line of the light entry hole J formed by the plurality of blades 15 are all collinear with an optical axis of the lens 21. Herein, the aperture 1 may be installed on the lens 21, or may be installed at the free end of the camera motor 22, to implement synchronous (e.g., collaborative, simultaneous) movement between the aperture 1 and the lens 21. A miniaturized structure of the aperture 1 is beneficial to a lighter and thinner design of the camera module 10 herein.

Figure 17:
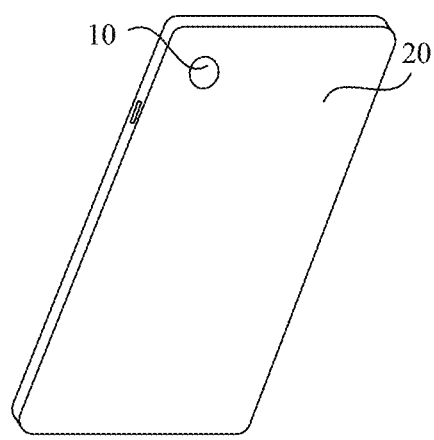
FIG. 17 is a schematic diagram of a structure of an electronic device according to embodiments of this application.

Based on the camera module 10, this application further provides an electronic device. The electronic device may be a mobile phone, a tablet computer, a vehicle-installed monitoring device or any other suitable electronic device, which all belong to portable miniature devices. The camera module 10 is installed on a device body, to implement a photographing function of the electronic devices. Taking a mobile phone 100 shown in FIG. 17 as an example, the mobile phone 100 has a mobile phone body 20. The camera module 10 is installed on a back side of the mobile phone body 20, is equivalent to a rear-view photographing structure of the mobile phone 100, and is configured to implement a rear-view photographing function.

A person skilled in the art can make various modifications and variations to the embodiments of this application without departing from the scope of embodiments of this application. This application is intended to cover these modifications and variations provided that they fall within the scope of protection defined by the following claims and their equivalent technologies.

What is claimed is:

1. An aperture, comprising: a base, a carrier base, a driver, a resilient sheet, and a plurality of blades;
   wherein the base is coupled to a camera component, and a first optical hole for light to pass through is formed on the base, an axis line of the first optical hole is collinear with an optical axis of the camera component;
   each blade of the plurality of blades is hingedly coupled to the base, and the plurality of blades are distributed annularly around the first optical hole to form a light entry hole, the light entry hole being coaxial with the first optical hole;
   the carrier base is connected to the base via the resilient sheet, and the carrier base is configured to drive each blade to rotate relative to the base, and to change a size of the light entry hole; and
   the driver is configured to drive the carrier base to rotate along a rotational axis, the rotational axis being collinear with the axis line of the first optical hole, wherein the driver comprises a driving coil and a driving magnet; and
   the driving coil is disposed on a first side of the base facing the carrier base and the driving magnet is disposed on a second side of the carrier base facing the base, wherein the driving coil is not in contact with the driving magnet.

2. The aperture according to claim 1, further comprising a second driver, the driver and the second driver are disposed symmetrically about the axis line of the first optical hole.

3. The aperture according to claim 1, further comprising an induced magnet and a position detection module, wherein:
   the induced magnet is disposed on the carrier base and the position detection module is coupled to the base.

4. The aperture according to claim 1, wherein a shaft hole and a sliding slot are formed on each blade; and
   a hinged shaft for receiving the shaft hole is formed on the base, and a sliding shaft for slidably receiving the sliding slot is formed on the carrier base.

5. The aperture according to claim 1, further comprising a partition plate, wherein a second optical hole for light to pass through is formed on the partition plate; and
   the partition plate is disposed on a side of the plurality of blades along a direction of the optical axis, the second optical hole is coaxial with the light entry hole, and a diameter of the second optical hole is less than a maximum diameter of the light entry hole.

6. A camera module, comprising: a camera component and an aperture, wherein:
   the aperture comprises a base, a carrier base, a driver, a resilient sheet, and a plurality of blades;
   wherein the base is coupled to a camera component, and a first optical hole for light to pass through is formed on the base, an axis line of the first optical hole is collinear with an optical axis of the camera component;
   each blade of the plurality of blades is hingedly coupled to the base, and the plurality of blades are distributed annularly around the first optical hole, so that a light entry hole coaxial with the first optical hole is formed among the plurality of blades;
   the carrier base is connected to the base via the resilient sheet, and the carrier base is configured to drive each blade to rotate relative to the base, to change a size of the light entry hole;
   the driver is configured to drive the carrier base to rotate along a rotational axis, the rotational axis being collinear with the axis line of the first optical hole, wherein the driver comprises a driving coil and a driving magnet, the driving coil is disposed on a first side of the base facing the carrier base and the driving magnet is disposed on a second side of the carrier base facing the base, wherein the driving coil is not in contact with the driving magnet; and
   the aperture is disposed on a light entry side of the camera component.

7. The camera module according to claim 6, further comprising a second driver the driver and the second driver are disposed symmetrically about the axis line of the first optical hole.

8. The camera module according to claim 6, further comprising an induced magnet and a position detection module, wherein:
   the induced magnet is disposed on the carrier base and the position detection module is coupled to the base.

9. An electronic device, comprising: a device body and a camera module coupled to the device body, wherein:
   the camera module comprises a camera component and an aperture,
   the aperture comprises a base, a carrier base, a driver, a resilient sheet, and a plurality of blades;
   the base is coupled to a camera component, and a first optical hole for light to pass through is formed on the base, an axis line of the first optical hole is collinear with an optical axis of the camera component;

each blade of the plurality of blades is hingedly coupled to the base, and the plurality of blades are distributed annularly around the first optical hole to form a light entry hole, the light entry hole being coaxial with the first optical hole;

the carrier base is connected to the base via the resilient sheet, and the carrier base is configured to drive each blade to rotate relative to the base, and to change a size of the light entry hole;

the driver is configured to drive the carrier base to rotate along a rotational axis, the rotational axis being collinear with the axis line of the first optical hole, wherein the driver comprises a driving coil and a driving magnet, the driving coil is disposed on a first side of the base facing the carrier base and the driving magnet is disposed on a second side of the carrier base facing the base, wherein the driving coil is not in contact with the driving magnet; and the aperture is disposed on a light entry side of the camera component.

10. The electronic device according to claim 9, wherein a shaft hole and a sliding slot are formed on each blade; and
a hinged shaft for receiving the shaft hole is formed on the base, and a sliding shaft for slidably receiving the sliding slot is formed on the carrier base.

11. The electronic device according to claim 9, further comprising a partition plate, wherein a second optical hole for light to pass through is formed on the partition plate; and
the partition plate is disposed on a side of the plurality of blades along a direction of the optical axis, the second optical hole is coaxial with the light entry hole, and a diameter of the second optical hole is less than a maximum diameter of the light entry hole.

* * * * *